United States Patent
Mohri et al.

[11] Patent Number: 5,091,620
[45] Date of Patent: Feb. 25, 1992

[54] AUTOMATIC ELECTRIC DISCHARGE MACHINING METHOD AND APPARATUS WITH PERIODIC SENSING OF SURFACE ROUGHNESS OF THE WORKPIECE

[75] Inventors: Naotake Mohri, Aichi; Nagao Saito, Tokyo, both of Japan

[73] Assignee: Mitsubishi Denki K.K., Tokyo, Japan

[21] Appl. No.: 513,750

[22] Filed: Apr. 23, 1990

Related U.S. Application Data

[63] Continuation of Ser. No. 845,151, Mar. 27, 1986, abandoned.

[30] Foreign Application Priority Data

Sep. 27, 1985 [JP]  Japan .................................. 60-214002

[51] Int. Cl.$^5$ .............................................. B23H 7/20
[52] U.S. Cl. ................................................... 219/69.13
[58] Field of Search .............. 219/69.11, 69.17, 69.13, 219/121.83; 364/474.04, 474.14, 474.15, 474.17

[56] References Cited

U.S. PATENT DOCUMENTS

| | | | |
|---|---|---|---|
| 3,400,238 | 9/1968 | Zemberry | 219/69.17 |
| 4,045,641 | 8/1977 | Ullmann et al. | 364/474.14 |
| 4,052,583 | 10/1977 | Inoue | 219/69.17 |
| 4,394,558 | 7/1983 | Inoue | 219/69.17 |
| 4,559,434 | 12/1985 | Kinoshita | 219/69.17 |
| 4,606,007 | 8/1986 | Inoue | 219/69.17 |
| 4,623,772 | 11/1986 | Fery et al. | 219/69.17 |
| 4,628,170 | 12/1986 | Furukawa | 219/69.17 |

FOREIGN PATENT DOCUMENTS

| | | | |
|---|---|---|---|
| 55-84287 | 6/1980 | Japan | 219/121.83 |
| 58-56728 | 4/1983 | Japan | 219/69.13 |
| 171217 | 10/1983 | Japan | 219/69.11 |
| 192720 | 11/1983 | Japan | 219/69.13 |
| 59-87993 | 5/1984 | Japan | 219/121.83 |
| 60-10837 | 3/1985 | Japan | 219/121.83 |

OTHER PUBLICATIONS

"A Real 'Rough' Story" by Wijers in *EDM DIGEST*, Oct. 1985, vol. VII, No. 5, pp. 16–22.

*Primary Examiner*—Geoffrey S. Evans
*Attorney, Agent, or Firm*—Sughrue, Mion, Zinn, Macpeak & Seas

[57] ABSTRACT

A method and apparatus for electric discharge machining whereby the total machining time to machine a workpiece through coarse, medium and finish surface roughness stages is significantly reduced. Machining condition data for the three surface roughness stages is stored in a memory. As the machining progresses, the surface roughness of the workpiece is monitored. If the surface roughness is found to exceed the reference level for the corresponding stage, machining using the present conditions is continued, whereas, if the surface roughness is below the reference level, the machining conditions are switched to those of the next stage.

1 Claim, 3 Drawing Sheets

AUTOMATIC ELECTRIC DISCHARGE MACHINING METHOD AND APPARATUS WITH PERIODIC SENSING OF SURFACE ROUGHNESS OF THE WORKPIECE

This is a continuation of application Ser. No. 06/845,151 filed Mar. 27, 1986, now abandoned.

BACKGROUND OF THE INVENTION

The present invention relates to a method of machining a workpiece by electric discharge while holding the workpiece on a mounting stand in an electric discharge machining process consisting of a series of machining steps. The invention also relates to an apparatus for practicing the method.

In an electric discharge machining operation with an electric discharge machining apparatus such as a wire electric type electric discharge machining apparatus or an engraving type electric discharge machining apparatus, it is generally required to change electric discharge machining conditions in each of a plurality of machining steps, namely, in each of coarse, medium and finish machining steps, which are generally carried out in the stated order.

In a conventional electric discharge machining apparatus, as disclosed by Japanese Published Patent Application No. 3079/1972, in each of the machining steps mentioned above, the respective machining conditions, such as discharge current, discharge voltage, pulse width, and pause time, are set either according to a standard machining condition table or manually according to the experience and intuition of the operator.

In an NC (numerically controlled) electric discharge machining apparatus developed recently, machining conditions and machining evaluation data such as machining speed, electrode consumption, and machined surface roughness in combination are complied empirically based on a standard machining operation and are stored as data files in memory. Access is made to the data files as required during subsequent machining operations.

The conventional electric discharge machining apparatus designed as described above is disadvantageous in that the evaluation of the actual machined surface roughness for set machining conditions depends entirely on the operator; that is, the evaluation is not always correct. In addition, it is very frequently necessary to suspend the machining operation to evaluate the machined surface roughness. Thus, the total machining time is long and it is not possible to automate the machining operation.

On the other hand, in the NC apparatus, the data files are the accumulation of data for standard machining conditions, and therefore it is impossible to set detailed machining conditions as the actual machining operation progresses. For instance, in the case where, during a machining operation it is required to change from first machining conditions to second machining conditions by switching data files, the second machining conditions must be made available sufficiently before the position where the conditions are to be switched. That is, since the machined surface roughness is not monitored during the machining operation and the machining operation is carried out on a continuous basis, it is always necessary to carry out each stage of machining for a sufficiently long period as to guarantee that the desired surface roughness for that stage is attained. Therefore, in practice, much machining time is wasted since machining will often continue when the desired surface roughness has already been obtained.

SUMMARY OF THE INVENTION

Overcoming the difficulties of the conventional methods and apparatuses discussed above, according to the invention, during an electric discharge machining operation or with the electric discharge machining operation suspended, the machined surface is automatically or semi-automatically or manually measured with the workpiece held as it is (hereinafter referred to as "on-the-machine measurement") for evaluation of the electric discharge machined surface or detection of the occurrence of abnormal conditions, whereby the succeeding machining conditions and the next measurement evaluation time instant are automatically set for the following machining steps in the machining operation.

More specifically, provided by the invention is a method in which a workpiece is machined by electric discharge under first machining conditions for a predetermined period of time, and with the electric discharge machining operation of the workpiece suspended, the machined surface roughness of the workpiece held as it is measured, and the measurement result is compared with a desired machined surface roughness to set the subsequent machining conditions. The invention also provides an apparatus for practicing the method.

In the method or apparatus of the invention, the machining operation is suspended, and with the electrode retracted, a measuring device is automatically or semi-automatically or manually set close to the workpiece to measure the machined surface roughness thereof. In other words, during the machining operation, the machined surface roughness of the workpiece is measured with the workpiece held as it is, and the subsequent machining conditions are automatically set according to the evaluation of the surface roughness.

DESCRIPTION OF THE PREFERRED EMBODIMENTS

Figure 1:
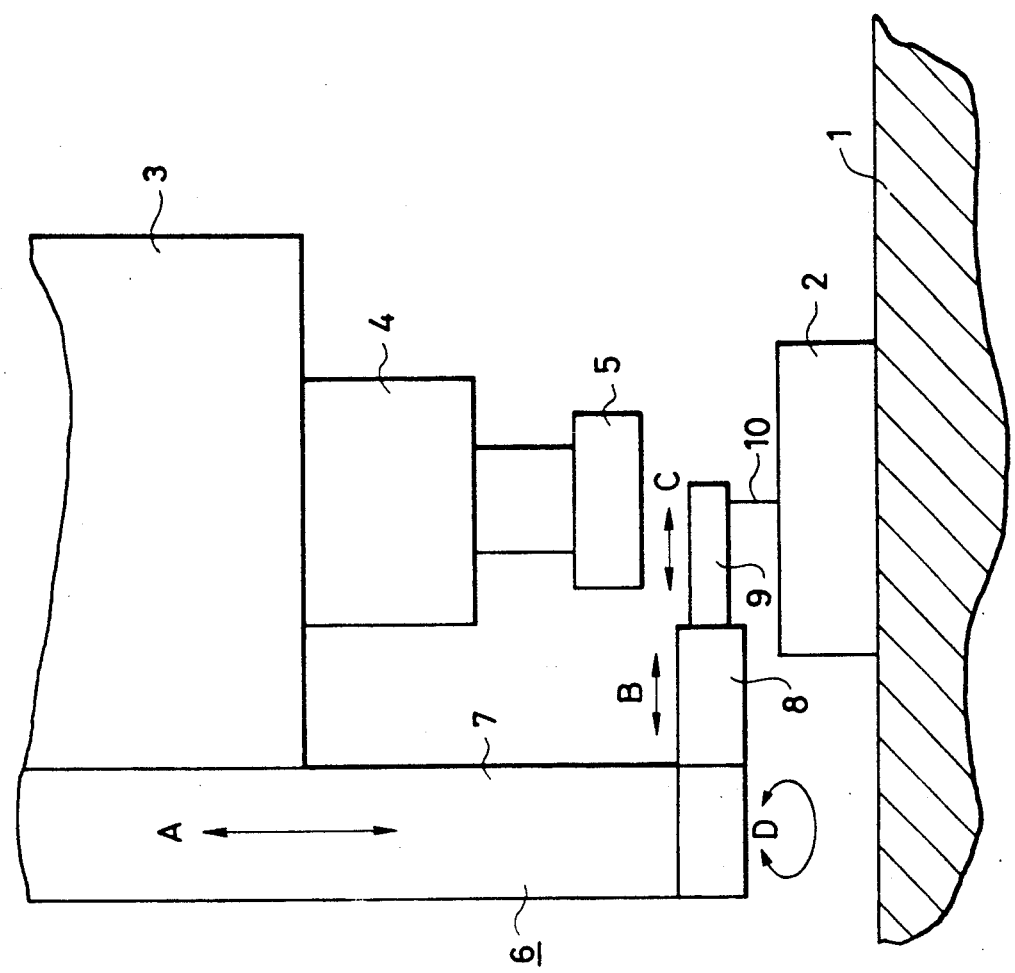
FIG. 1 is a graphical representation indicating an example of the results of the surface roughness measurement of a workpiece carried out according to the invention.

FIG. 1 shows an example of the result of the on-the-machine measurement of surface roughness of a workpiece which is performed according to the invention.

In FIG. 1, the horizontal axis represents machining time and the vertical axis surface roughness. That is, FIG. 1 indicates surface roughness with machining time in the case where machining conditions are changed three times until finish machining is carried out after medium machining. As is apparent from FIG. 1, the surface roughness changes exponentially whenever the machining conditions are changed. In other words, after the machining conditions are changed, the surface roughness quickly changes into a finer one which is suitable for the new machining conditions. Therefore, continuation of the machining operation after the changing of the surface roughness into the finer one wastes time.

Accordingly, the on-the-machine measurement described above eliminates the aforementioned useless operation and makes it possible to automatically set most suitable machining conditions for workpieces.

In FIG. 1, symbol designates a first stage with a pulse peak value 4 A; x, a second stage with a pulse peak value of 3 A; ∆, a third stage with a pulse peak value of 2 A; and ●, a fourth stage with a pulse peak value 1 A.

Figure 2:
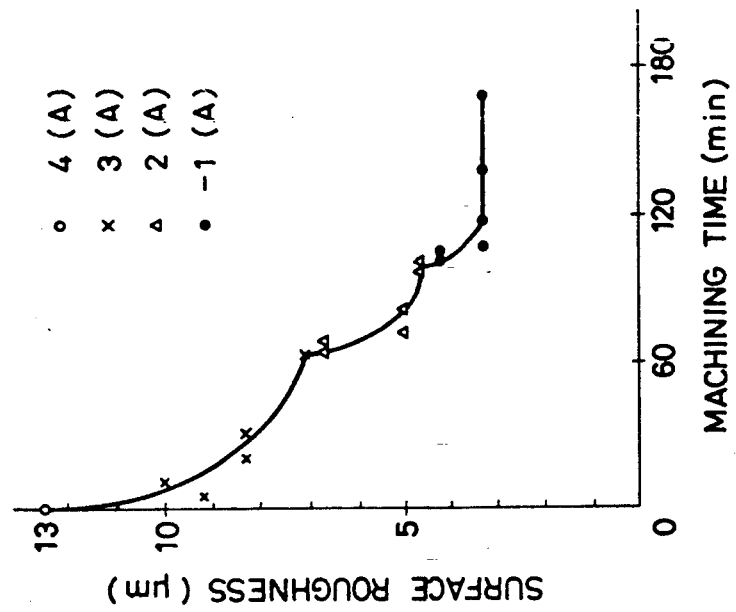
FIG. 2 is an explanatory diagram showing an example of an electric discharge machining apparatus according to the invention.

FIG. 2 is an explanatory diagram showing the arrangement of an apparatus for practicing an electric discharge machining method according to the invention.

In FIG. 2, reference numeral 1 designates a machining table; 2, a workpiece on the machining table 1; 3, the column of the electric discharge machining apparatus; 4, a spindle secured to the column and slidable in its axial direction; 5, an electrode connected to the spindle 4 and confronting the workpiece 2; 6, a measuring device (in which the specific feature of the invention resides), the measuring device 6 being integrally connected to the column 3; 7, a supporting post of the measuring device 6 which is movable in the lengthwise direction of the spindle 4 (as indicated by the arrow B); and 9, a surface roughness sensor which is also movable in a direction perpendicular to the axis of the spindle (as indicated by the arrow C). A stylus 10 is coupled to the sensor 9. The stylus 10 is brought into contact with the workpiece 2. The movable part 8 is designed so as to be able to rotate around the supporting post 7 as indicated by the arrow D in FIG. 2. The supporting post, the movable part and the sensor are automatically operated by drive sources such as electric motors in response to instruction signals from an instructing unit such as an NC device.

Figure 3:
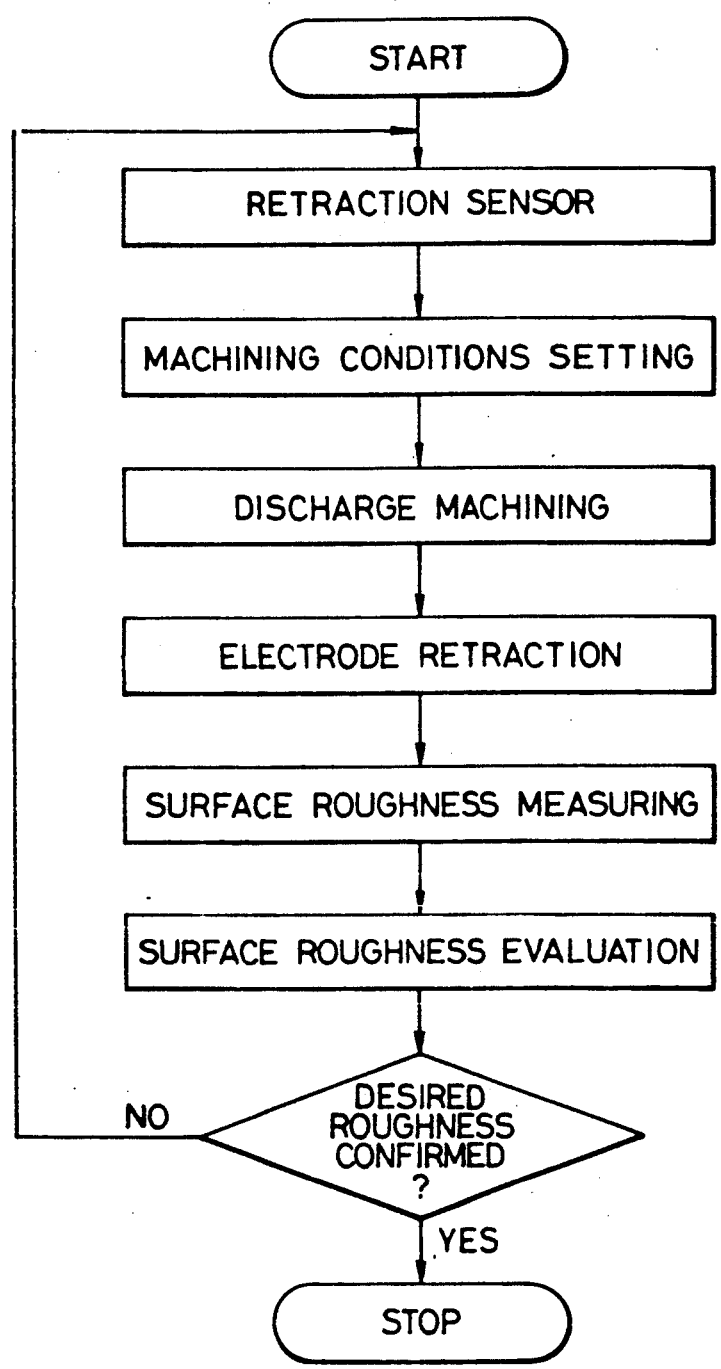
FIG. 3 is a flow chart showing a series of machining control steps according to an electric discharge machining method of the invention.

FIG. 3 is a flow chart of a series of machining control steps according to the aforementioned on-the-machine measurement.

In FIG. 3, in a machining condition setting step, changing and adding of data files is carried out according to surface roughness evaluation, that is, learning functions are carried out, and the next surface roughness measuring time instant is determined. In the case of FIG. 2, the surface roughness sensor is of the differential transformer type, and the surface of the workpiece is scanned by the stylus 10 as the table is moved by instruction signals from the NC device.

The surface roughness evaluation is carried out with respect to maximum surface roughness ($R_{max}$), square average, waviness, and spectrum. These data values are automatically calculated by a computer.

Furthermore, in this case, abnormal machining, for instance, with an arc discharge, is automatically recognized, which is reflected on setting of machining conditions in the following stage.

Figure 4:
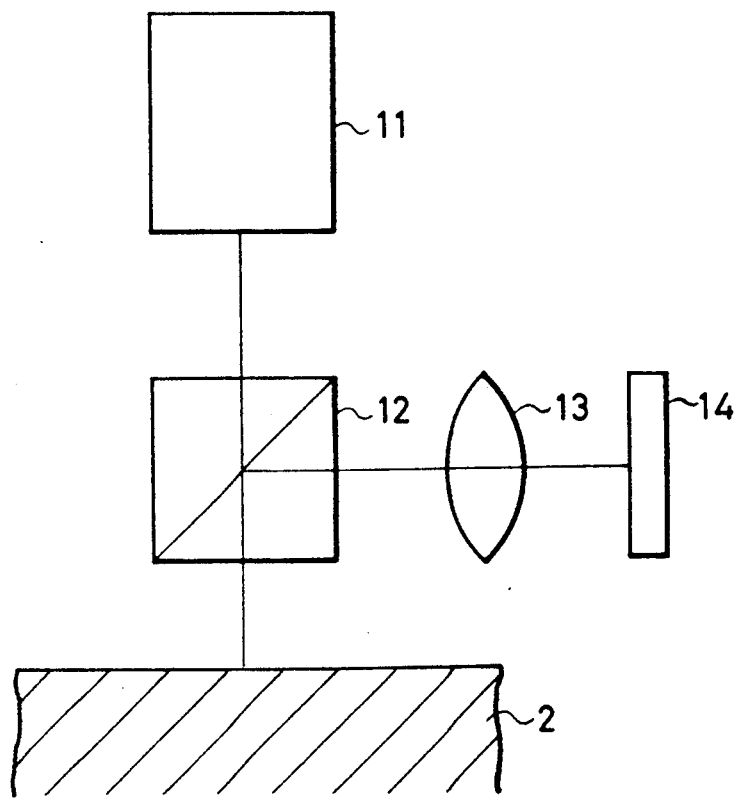
FIG. 4 is an explanatory diagram showing surface roughness sensor.
Figure 5:
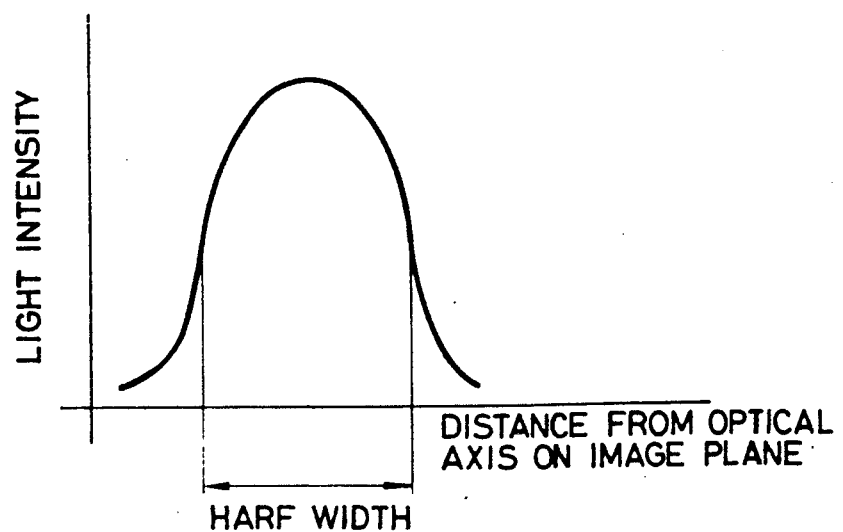
FIG. 5 is a graphical representation indicating the Gaussian intensity distribution of the diffraction image formed on an optical sensor.

Another example of the surface roughness sensor is an optical sensor. The principle of the optical sensor will be described with reference to FIG. 4. In the optical sensor, unlike the stylus type sensor, the roughness of the surface of a workpiece can be measured at high speed without scanning the surface with the stylus. In FIG. 4, a laser beam from a modulated laser beam 11, after being reflected and diffracted by the surface of a workpiece 2, is applied through a beam splitter 12 and a Fourier transform lens 13 to an optical sensor 14. The diffraction image has an isotropic Gaussian intensity distribution, as indicated in FIG. 5, especially in the case of an electric discharge machining surface. It is well known in the art that the half-amplitude level of the intensity distribution is proportional to the maximum surface roughness $R_{max}$ of a workpiece. Therefore, the surface roughness of a workpiece can be estimated by measuring the half-amplitude level.

In practice, a CCD (charge-coupled device) is employed as the optical sensor. The CCD can measure an optical intensity distribution with a resolving power of the order of 20 microns. In the case where an on-the-machine surface roughness measurement is carried out with an optical sensor of this type, the effects of variable ambient light must be eliminated. For this purpose, intensity modulation is applied to the laser beam source unit. In the case where a helium-neon gas laser is employed as the laser beam source, a modulation system is employed in which a light beam is periodically interrupted by a rotary chopper. In the case where a semiconductor laser is used, a modulation system is employed in which the voltage applied to the light source is periodically changed.

In each of the cases, when only the above-described periodic variation is extracted from the output voltage of the optical sensor 14, the effects of external light coherent to an on-the-machine measurement are eliminated so that the surface roughness can be measured.

As is apparent from the above description, according to the invention, a surface roughness measuring device is included in an electric discharge machining system to perform on-the-machine measurement. Therefore, the results of measurement can be automatically utilized in setting electric discharge machining conditions.

Accordingly, a high precision electric discharge machining operation can be automatically achieved at high speed.

We claim:

1. A fully automated electric discharge machine comprising:

means for machining an electrically conductive workpiece by electric discharge;

an automated workpiece machined surface roughness measuring device integrally connected to said machining means and movable with respect to said workpiece;

means for automatically, periodically operating said machine for a predetermined period of time under first electric discharge machining conditions to machine said workpiece to a first relatively rough desired machine surface roughness under conditions where the surface roughness condition changes exponentially such that after machining conditions are changed, surface roughness quickly changes into a finer one suitable for new machining conditions but short of this point where, irrespective of continued machining time, the surface roughness stays the same;

means for selecting, according to the result of measurement by said workpiece machined surface roughness measuring device, electric discharge machining conditions stored in a memory unit for said machine for machining said workpiece to a further desired machine surface roughness which has a surface roughness which is less than that sensed by said electric discharge machine surface roughness measuring device during the initial machining of said workpiece, and wherein said means for automatically, periodically operating said electric discharge machine for a predetermined period of time comprises means for automatically suspending the electric discharge machining of said workpiece at termination of said first time period while holding said workpiece in said machine;

means for automatically operating said workpiece surface roughness measuring device for measuring the machine surface roughness of said workpiece at termination of said first time period;

means for comparing the surface roughness measured in the preceding step with a desired machine surface roughness reaching a suitable change in said exponential indicative of said roughness change to said finer one but short of the point where, irrespective of continued machining time, the surface roughness stays the same;

means for automatically continuing the electric discharge machining of said workpiece under said first electric discharge machining conditions for a second predetermined period of time until the surface roughness of the workpiece machined surface reaches said first desired machine surface roughness and when the surface roughness does not exceed said first desired machine surface roughness and when the surface roughness does not exceed said first desired machine surface roughness, automatically changing said first electric discharge machining conditions to said second, different electric discharge machining conditions correlated to a second predetermined desired surface roughness and machining said workpiece under said second electric discharging machining conditions for at least one further predetermined period of time and comparing the surface roughness and repeating that sequence at further predetermined periods of time if needed until said second desired machine surface roughness of the workpiece evidences a suitable change in the exponential indicative of said roughness change to at least a finer one for said second machining conditions but short of the point where, irrespective of continued machining time, the surface roughness stays the same.

* * * * *